HUB COUPLING SYSTEM
Filed Aug. 2, 1965
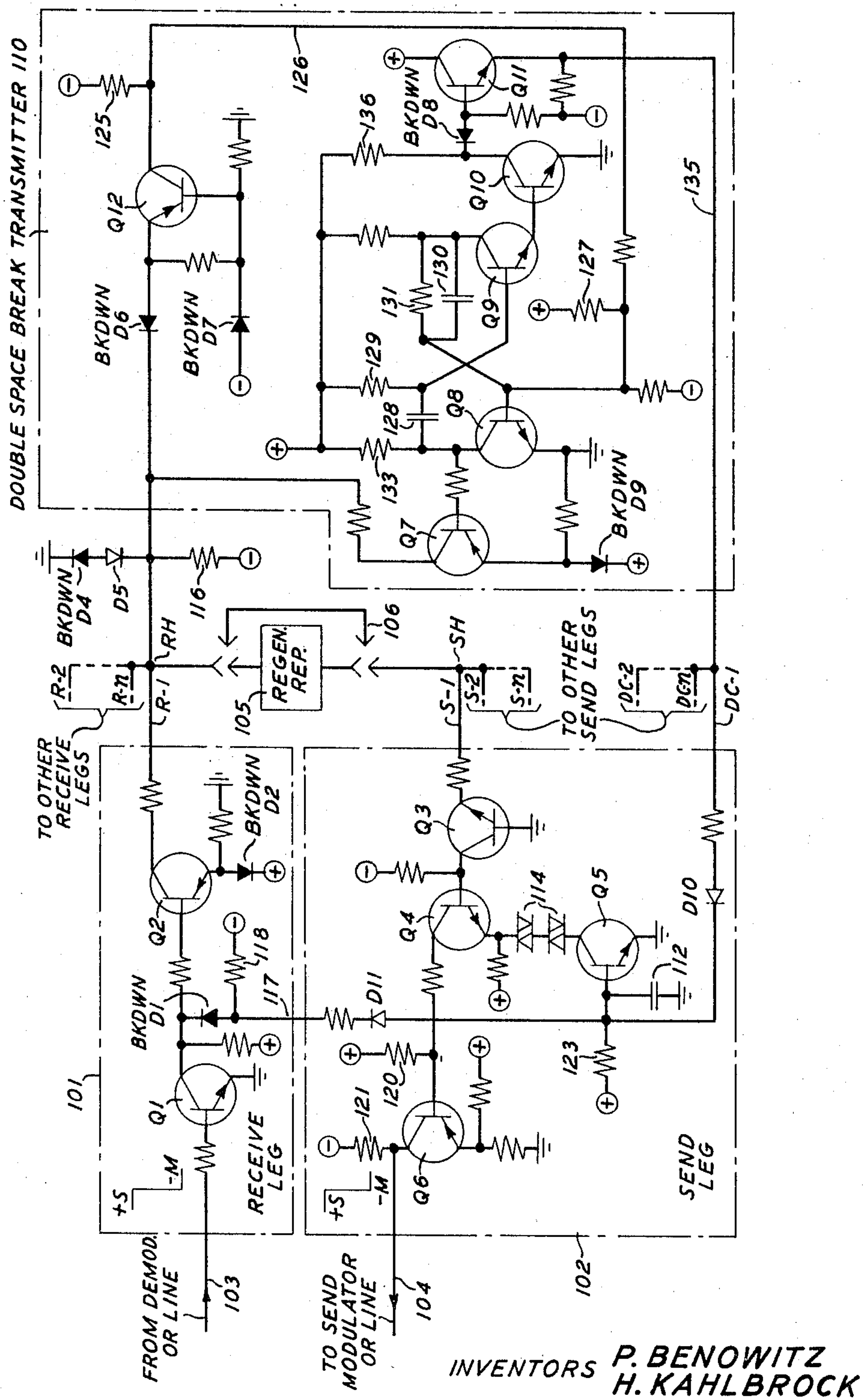
INVENTORS P. BENOWITZ H. KAHLBROCK
BY R C Lipton
ATTORNEY United States Patent Office 3,443,022
Patented May 6, 1969

3,443,022
HUB COUPLING SYSTEM

Paul Benowitz and Heinz Kahlbrock, Brooklyn, N.Y., assignors to Bell Telephone Laboratories, Incorporated, New York, N.Y., a corporation of New York Filed Aug. 2, 1965, Ser. No. 476,515
Int. Cl. H01l *15/00;* H03k *5/20*
U.S. Cl. 178—2 8 Claims

ABSTRACT OF THE DISCLOSURE

Subscriber data lines are interconnected by way of a common hub. To preclude the recirculation of signals from the subscriber receiving leg back to the sending leg, each subscriber is provided with a control circuit which blocks the retransmission of signals from the hub to the sending leg while data signals are being received from the subscriber. To advise all subscribers that the sending subscriber is being interrupted by another subscriber, a "double space" detector common to all the subscribers detects when two or more send into the hub and in response thereto unblocks all the sending legs and sends a time "break" signal into the hub and therefore to all sending legs.

This invention relates to a data channel hub concentrations and, more particularly, to control circuits for hub coupling circuits.

It is a broad object of this invention to provide an improved control circuit for hub coupling units.

Hub concentrations provide arrangements for permitting any one of a group of data exchange subscribers to transmit to all others in the group. This is accomplished by connecting each subscriber transmission circuit to a common receiving hub or terminal by way of an individual receiving leg and to a common sending hub by way of an individual sending leg. By interconnecting the receiving hub and the sending hub, by way of a regenerative repeater, for example, the marking and spacing data signals incoming from any one of the subscriber transmission circuits are applied to the receive hub via the individual receiving leg, repeated to the send hub, and thus simultaneously transmitted to all other subscribers through their respective sending legs.

When a subscriber is sending into the hub, provision must be made to preclude retransmission back to the subscriber since such retransmission would mutilate the signals. Accordingly, a control circuit is provided for each subscriber transmission circuit to block the sending leg when signals are received by the associated receiving leg. Other subscribers, however, must be permitted to interrupt the sending subscriber by transmitting into the hub predetermined signals such as a spacing "break" signal. In prior arrangements, this function is provided by a double space detector individual to each subscriber which detects when the individual subscriber and another subscriber simultaneously send spacing signals into the hub and, in response thereto, unblocks the sending leg. Where the hub serves a large number of subscribers, however, the provision of double space detectors for each subscriber is relatively expensive. In addition, when two subscribers are simultaneously sending data signals into the hub, garbled data may be transmitted to the other subscribers who are unaware that this is caused by a subscriber breaking in rather than by line hits, for example.

Accordingly, it is an object of this invention to provide a simple and economical control circuit for a hub concentration.

It is another object of this invention to preclude garbled transmission when the sending subscriber is interrupted by a second subscriber.

It is a feature of this invention that the double space detector is provided on a per hub basis common to all the subscribers rather than individual to each subscriber.

It is a feature of this invention that the common detector unblocks all the sending legs when a double space is detected.

It is a feature of this invention that a timed "break" signal is applied to the hub when a double space is detected. This advises all subscribers that the sending subscriber has been interrupted. In addition, since the sending leg of the sending subscriber is unblocked by the double space detector, the sending subscriber is also advised of the interruption.

The foregoing and other objects and features of this invention will be fully understood from the following description of an illustrative embodiment thereof taken in conjunction with the accompanying drawing which shows, in schematic form, the details of a hub control circuit for a hub repeater system in accordance with this invention.

Referring now to the drawing, the hub circuit shown therein includes receiving hub RH and sending hub SH. Receiving hub RH receives signals by way of lead R–1 from a receive leg, generally indicated by block 101, and is further multipled to other similar receiving legs via leads R–2 through R–*n*. The hub voltage at terminal RH is provided by way of ground through breakdown diodes D4 and D5 and to negative battery by way of resistor 116. This maintains receiving hub RH during normal idle or marking conditions at, for example 6 volts negative with respect to ground by virtue of the voltage drop across diode D4. When incoming signals are received by receiving hub RH from a receiving leg, these signals are repeated by regenerative repeater 105 to sending hub SH or, in the alternative, directly applied to sending hub SH by way of lead 106. Sending hub SH, in turn, applies the signals in parallel to leads S–1 through S–*n* to the send legs such as the send leg connected to lead S–1 and generally indicated by block 102. It is noted that receive leg 101 receives signals via incoming line 103 and send leg 102 sends signals over outgoing line 104. Lines 103 and 104, in turn, comprise a subscriber channel arranged, in accordance with this embodiment, for half-duplex operation.

Signals received by receive leg 101 by way of incoming line 103 constitute negative signals when the line is idle or, alternatively, negative marking and positive spacing signals when incoming data signals are being received. The application of the negative marking signal to the base of transistor Q1 maintains the transistor nonconductive, permitting the application of positive battery to its collector. This positive collector potential is applied to the base of transistor Q2 and the latter transistor is also maintained nonconductive. Accordingly, during the reception of marking signals no current flows into the receiving hub which is permitted to retain the negative hub voltage, as previously described.

In the event that a positive spacing signal is received over line 103 and thus applied to transistor Q1, the transistor turns ON, bringing the collector voltage down to ground. This ground potential is applied to the base of transistor Q2 turning it ON, whereby emitter-to-collector current is provided to receiving hub RH. This emitter-to-collector current is derived from positive battery by way of breakdown diode D–2 thus applying to receiving hub RH a positive voltage with respect to ground. Accordingly, the potential on receiving hub RH is negative when marking or idle signals are being received and goes positive when a spacing signal is received by a receiving leg such as receive leg 101.

As previously disclosed, signals on receiving hub RH are repeated to sending hub SH and thence to the send legs. The application of the negative marking signal to send leg 102 by way of lead S–1 lowers the emitter potential of transistor Q3 whereby the transistor turns ON. This applies a ground potential to the base of transistor Q4 and the latter transistor thus cannot conduct. Accordingly, positive battery is applied by way of resistor 120 to the base of transistor Q6, turning OFF this transistor whereby a negative potential is applied to lead 104 by way of resistor 121. Lead 104, in turn, preferably extends to the sending modulator or the outgoing line. Thus, when a negative marking signal is received by sending hub SH and applied to a sending leg such as send leg 102, a negative potential corresponding to a marking signal is, in turn, applied to the outgoing line such as lead 104.

In the event that receiving hub RH has applied thereto a positive spacing signal, this positive signal is repeated to sending hub SH and thence to send leg 102, for example, by way of lead S–1. The consequent application of a positive potential to the emitter of transistor Q3 turns the transistor OFF. Positive battery is thus applied to the base of transistor Q4. As described hereinafter, if the signals are not being received by the receive leg associated with the same subscriber as the send leg, the emitter of transistor Q4 has a potential close to ground applied thereto. Consequently, the application of positive battery to the base of transistor Q4 turns the transistor ON, thereby applying this emitter ground potential by way of its collector to the base of transistor Q6. Transistor Q6 thus turns ON and the positive potential applied to its emitter drives its collector positive. Thus, the application of a positive spacing signal to send leg 102 by send hub SH results in the application of a positive spacing signal to outgoing line 104.

The receive leg and the send leg of each subscriber is arranged to preclude the reception of signals from the hub when the subscriber is sending signals into the hub. This is accomplished by disabling transistor Q4 when signals are being received by the receive leg.

Assuming now that an idle or marking signal is applied to transistor Q1 by way of lead 103, transistor Q1 is turned OFF, as previously described, rendering its collector positive. This positive potential is applied through breakdown diode D1 to lead 117. Diode D11 in send leg 102, however, precludes the application of the positive potential on lead 117 therethrough to capacitor 112. Accordingly, capacitor 112 is charged to positive battery by way of resistor 123. This positive charge, in turn, is applied to the base of transistor Q5 turning it ON. Thus the collector of transistor Q5 is brought down to ground potential and this ground potential is applied to the reversely poled diodes 114. Since the breakdown voltage of diodes 114 is small, the potential applied to the emitter of transistor Q4 is only slightly positive with respect to ground. With the potential on the emitter of transistor Q4 brought down to this slightly positive voltage, the transistor is enabled to pass spacing signals therethrough, as previously described.

Recalling now that the application of a spacing signal to transistor Q1 turns the transistor ON thereby bringing its collector potential down to ground, it is noted that this ground potential is also applied through breakdown diode D1. This drives the potential of lead 117 negative by virtue of the connection of negative battery thereto by way of resistor 118. The negative potential is then applied through diode D11 of send leg 102 to capacitor 112. Since the negative charge on capacitor 112 is also applied to the base of transistor Q5, the latter transistor is turned OFF. This removes the ground applied to the emitter of transistor Q4 and positive battery is thus provided to the emitter. Accordingly, transistor Q4 does not turn ON when transistor Q3 applies a positive signal to the base of transistor Q4 in response to the reception of a spacing signal from sending hub SH. Thus, when spacing signals are received by a receive leg, transistor Q4 of the associated send leg is maintained OFF to preclude the repeating of the signals to the sending subscriber.

When the spacing signal from line 103 terminates, the negative potential applied to lead 117 is removed and capacitor 112 is again charged via resistor 123 to turn ON transistor Q5 and re-enable transistor Q4. It is noted, however, that capacitor 112 provides a delay in the returning of transistor Q5 to the ON condition. This is to compensate for the delay of regenerative repeater 105 in repeating the signals to send leg 102 via send hub SH.

Receiving hub RH is also connected to a double space detector and break transmitter, generally indicated by block 110. The function of the double space detector and break transmitter is to determine when a second subscriber breaks into the transmission of a first subscriber and upon the determination thereof to indicate to all subscribers, including the original sending subscriber, that a second subscriber has transmitted a space or break or attempted to interrupt the transmission of the sending subscriber.

Detection of a double space, that is, the transmision of spacing signals by two or more subscribers into receiving hub RH, is provided by transistor Q12. The base of transistor Q12 is connected to negative battery by way of breakdown diode D7. The emitter of transistor Q12 extends by way of breakdown diode D6 to receiving hub RH. It is recalled that when all receiving legs are sending idle or marking signals into receiving hub RH, no current flows thereto and receiving hub RH has a potential negative with respect to ground. This potential is insufficient to break down diode D6 and thus the emitter potential is the same as the base and transistor Q12 does not conduct. Accordingly, the collector of transistor Q12 has a negative potential applied thereto by way of resistor 125.

When a receiving leg, such as receiving leg 101, receives a spacing signal, transistor Q2 supplies current to receiving hub RH and the hub potential is raised above ground, as previously described. This potential is just sufficient to break down diode D6. Virtually all of the current, however, from receive leg 101, passes through resistor 116 to negative battery. Accordingly, very little current is applied to the collector or transistor Q12 from the emitter. Consequently, there is virtually no current flow through resistor 125 to negative battery and the collector of transistor Q12 is maintained negative at substantially the same voltage level as previously described with respect to the reception of idle or marking signals by receiving hub RH.

Assuming now that a second subscriber sends a spacing or break signal, additional current now flows from the subscriber receiving leg into receiving hub RH. Since the spacing signal from the first subscriber breaks down diode D6, as previously described, the additional spacing current from the second subscriber is permitted to pass through diode D6, the emitter-to-collector path of transistor Q12 and resistor 125 to negative battery, substantially raising the potential of the collector of transistor Q12 toward ground. Thus, it is seen that the collector of transistor Q12 is maintained negative unless two or more subscribers simultaneously transmit spacing signals into receiving hub RH whereupon the collector potential is driven positive toward ground.

The break transmitter portion of the circuit includes transistors Q8 and Q9, which transistors are arranged as a monostable multivibrator. In the normal condition, with the base of transistor Q9 connected to positive battery by way of resistor 129, this latter transistor is maintained ON. This brings the collector voltage of transistor Q9 down toward ground, and this ground potential is applied to the base of transistor Q8 by way of resistor 131. Since, at the same time, the base of transistor Q8 is connected to the negative potential at the collector of transistor Q12 by way of lead 126, the cumulative effect is to maintain the base of transistor Q8 below ground, thereby maintaining the latter transistor OFF.

Assuming now that a double space is received by receiving hub RH, the collector of transistor Q12 is driven positive toward ground, as previously described. Accordingly, the potential on the base of transistor Q8 is correspondingly raised until it is brought above ground by the positive battery connected thereto by way of resistor 127. Accordingly, transistor Q8 turns ON and the resultant collector-to-emitter current removes the positive potential applied to the collector by way of resistor 133. This negative-going transition at the collector of transistor Q8 is passed through capacitor 128 to the base of transistor Q9 turning the latter transistor OFF. The collector of transistor Q9 is thus driven positive, feeding back a positive-going potential to the base of transistor Q8 by way of resistor 131 and shunting capacitor 130. At this time, capacitor 128 again begins to charge by way of resistor 129 to positive battery. After a predetermined interval of time corresponding to a break signal interval, the charge on capacitor 128 is raised sufficiently to turn transistor Q9 back ON. This results in a negative going transition at the collector of transistor Q9, which transition is passed through capacitor 130 to the base of transistor Q8 turning the latter transistor OFF. Accordingly, the multivibrator restores to its initial condition.

When the multivibrator is at its normal quiescent condition, transistor Q8 is turned OFF, as previously described, and its positive collector potential is applied to the base of transistor Q7. This maintains transistor Q7 OFF and precludes the passage, of emitter-to-collector current therethrough. When the multivibrator is driven to the off-normal condition in response to the reception of a double space, transistor Q8 turns ON lowering the base potential on transistor Q7. This permits emitter-to-collector current flow and with the emitter of transistor Q7 connected to positive battery by way of breakdown diode D9 and the collector of transistor Q7 connected to receiving hub RH, a simulated spacing signal is thus transmitted into the hub. Since the multivibrator remains off-normal for an interval corresponding to the duration of a break signal, a simulated break signal is thus transmitted into a hub when a double space is detected.

As previously described, in the quiescent condition of the multivibrator, transistor Q9 is conducting. Accordingly, its collector-to-emitter current is applied to the base of transistor Q10 and the latter transistor is also conducting. This brings the collector potential of transistor Q10 down to ground.

The collector of transistor Q10 is connected by way of breakdown diode D8 to the base of transistor Q11. Since, as previously described, the collector potential of transistor Q10 is close to ground, the drop across diode D8 renders the base of transistor Q11 negative with respect to ground. Since transistor Q11 is connected as an emitter follower, the emitter is correspondingly negative with respect to ground, thereby applying a negative potential to lead 135. Lead 135, in turn, is multiplied to leads DC–1 through DC–21 which latter leads then extend to corresponding ones of the send legs. Referring now to send leg 102, it is noted that lead 135 is connected to diode D10 which, in turn, is connected to capacitor 112. Since, in the quiescent condition of the multivibrator, lead 135 has a negative potential applied thereto, diode D10 functions to block this potential and consequently disconnecting lead 135 from capacitor 112. Similarly, corresponding diodes such as diode D10 in each of the other send legs, function to decouple lead 135 from the associated delay capacitors 112 in each of the send legs.

Assuming now that a double space is detected and the multivibrator is driven to the off-normal condition, transistor Q9 is turned OFF, as previously described. This stops the current flow into the base of transistor Q10 and the latter transistor turns OFF. With transistor Q10 turned OFF, positive battery is applied to the collector thereof by way of resistor 136. This increased positive potential thus raises the potential on the base of transistor Q11 to above ground. The emitter of transistor Q11 following the base potential is also raised above ground. Accordingly, lead 135 is driven positive and this positive potential is applied by way of leads DC–1 through DC–*n*, diodes D10 in each of the send legs to the associated capacitors 112.

Assuming now that the subscriber associated with lines 103 and 104 is sending when the double space is detected, it is recalled that the reception of spacing signals by receive leg 101 provides a negative potential by way of lead 117 and diode D11 to capacitor 112. This, in turn, turns OFF transistor Q5 whereby transistor Q4 is disabled to preclude the repeating of the signals back to the subscriber, as previously described. When the double space is detected, however, lead 135 is driven positive, as previously described, and this positive potential is provided by way of diode D10 to the base of transistor Q5. Accordingly, transistor Q5 is forced to turn ON, enabling transistor Q4. Since, as previously described, transistor Q7 is sending a spacing break signal into receive hub RH, with transistor Q4 enabled, the spacing break signal is repeated through sending hub SH, send leg 102 and line 104 back to the subscriber even though he is presently sending. Thus, it is seen that the disabling feature in send leg 102 is removed in the event that a double space is detected and a break signal is returned to all including the sending subscriber.

What is claimed is:

1. In a hub type data repeater system wherein a plurality of data channels are interconnected by way of a common hub, a receiving leg individual to each channel for applying data signals received from said channel to said common hub, a sending leg individual to each channel for repeating said data signals applied to said common hub to said channel, a control circuit individual to each channel and responsive to data signals received from said channel for blocking said sending leg individual thereto, and means common to said plurality of channels and responsive to the simultaneous reception of signals from two or more channels for precluding the operation of all of said control circuits.

2. In a hub type data repeater system in accordance with claim 1 wherein said common means includes means for applying a predetermined signal to said hub when said operations of said control circuits are precluded.

3. In a hub type data repeater system wherein a plurality of data channels are interconnected by way of a common hub, a receiving leg individual to each channel for applying data signals received from said channel to said common hub, a sending leg individual to each channel for repeating said data signals applied to said common hub to said channel, and means common to said plurality of channels and responsive to the simultaneous reception of signals from two or more channels for sending a predetermined signal to all of said channels.

4. In a hub type data repeater system wherein a plurality of data channels are interconnected by way of a common hub, a receiving leg individual to each channel for applying data signals received from said channel to said common hub, a sending leg individual to each channel for repeating said data signals applied to said common hub to said channel, a control circuit individual to each channel and responsive to data signals received from said channel for blocking said sending leg individual thereto, and means common to said plurality of channels and responsive to the simultaneous reception of signals from two or more channels for sending a predetermined signal to all of said channels.

5. A data signal repeater system comprising a plurality of data channels, a common hub, a receiving leg associated with each channel for applying signals received from said channel to said hub, a sending leg associated with each channel for sending said signals applied to said hub to said channel, signal detector means connected to said hub for detecting the simultaneous application of signals to said hub by two of said receiving legs, and means responsive to said signal detector means for applying a predetermined signal to all of said channels.

6. A data signal repeater system comprising a plurality of data channels, a common hub, a receiving leg associated with each channel for applying signals received from said channel to said hub, a sending leg associated with each channel for sending said signals applied to said hub to said channel, control means individual to each channel and responsive to signals received from said channel for blocking said sending leg associated thereto, signal detector means connected to said hub for detecting the simultaneous application of signals to said hub by two of said receiving legs, and means responsive to said signal detector means for applying a predetermined signal to all of said channels.

7. A data signal repeater system comprising a plurality of data channels, a common hub, a receiving leg associated with each channel for applying signals received from said channel to said hub, a sending leg associated with each channel for sending said signals applied to said hub to said channel, control means individual to each channel and responsive to signals received from said channel for blocking said sending leg associated thereto, signal detector means connected to said hub for detecting the simultaneous application of signals to said hub by two of said receiving legs, and means responsive to said signal detector means for disabling all of said control means.

8. A data signal repeater system comprising a plurality of data channels, a common hub, a receiving leg associated with each channel for applying signals received from said channel to said hub, a sending leg associated with each channel for sending said signals applied to said hub to said channel, control means individual to each channel and responsive to signals received from said channel for blocking said sending leg associated thereto, signal detector means connected to said hub for detecting the simultaneous application of signals to said hub by two of said receiving legs, means responsive to said signal detector means for disabling all of said control means, and other means responsive to said signal detector means for applying a predetermined signal to said hub.

References Cited

UNITED STATES PATENTS

| | | | |
|---|---|---|---|
| 2,542,208 | 2/1951 | Purris | 178—2 |
| 2,607,852 | 8/1952 | Rea | 178—2 |
| 2,639,320 | 5/1953 | Gardner | 178—2 |
| 2,994,736 | 8/1961 | Hopner | 178—2 |

THOMAS B. HABECKER, *Primary Examiner.*

U.S. Cl. X.R.

307—231